United States Patent [19]
Okuya

[11] Patent Number: 5,986,231
[45] Date of Patent: Nov. 16, 1999

[54] PRODUCTION METHOD FOR DEBURRING DIE FOR CASTINGS UTILIZING EDM

[76] Inventor: Yasuaki Okuya, Sora-machi 52, Heisaka-cho, Nishio-shi, Aichi-ken, Japan

[21] Appl. No.: 08/978,815

[22] Filed: Nov. 26, 1997

[30] Foreign Application Priority Data

Dec. 27, 1996 [JP] Japan .................................. 8-350859

[51] Int. Cl.$^6$ .................. B23H 1/00; B23H 9/12
[52] U.S. Cl. ..................... 219/69.17; 219/69.12
[58] Field of Search ............... 219/69.17, 69.2, 219/69.12; 364/474.04

[56] References Cited

FOREIGN PATENT DOCUMENTS 1-40224  2/1989  Japan .
1-115522 5/1989  Japan .

*Primary Examiner*—Geoffrey S. Evans
*Attorney, Agent, or Firm*—Griffin, Butler, Whisenhunt & Szipel, LLP

[57] ABSTRACT

A production method for deburring die for castings utilizes a machining gap defined between an electrode of an EDM apparatus and a deburring die member or a cut member, feed control of the electrode and electric discharge machining effected by applying a pulse voltage between the electrode and a steel sheet or cut member. In this method, a prototype of castings is horizontally hung in the apparatus with either one side thereof serving as a model for the front side of the lower deburring die while a contour of the prototype is two-dimensionally detected based on the X- and Y-coordinates, the values of which are inputted in a control unit of the EDM apparatus. Based on the values, a lower deburring die hole symmetrical with the contour of the prototype is formed in the steel sheet thereby producing the lower deburring die and the cut member. On the other hand, the prototype is horizontally hung in the EDM apparatus with the other side thereof serving as a model for the front side of the upper die and used as the electrode for engraving in the front surface of the cut member a geometry symmetrical with that of the prototype so that the upper deburring die is produced.

8 Claims, 8 Drawing Sheets

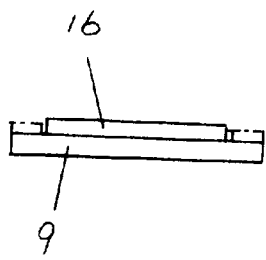
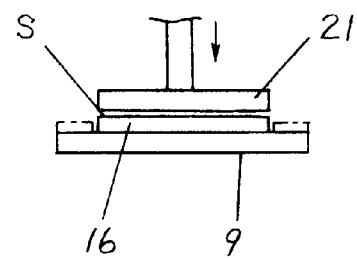
Fig. 10A                    Fig. 10B
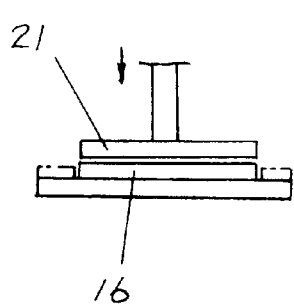
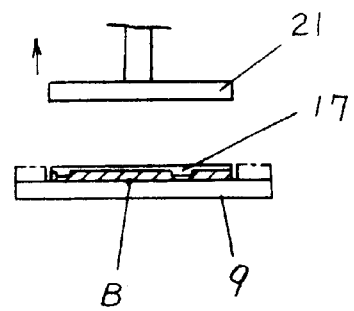
Fig. 10C                    Fig. 10D

PRODUCTION METHOD FOR DEBURRING DIE FOR CASTINGS UTILIZING EDM

BACKGROUND OF THE INVENTION

1. Technical Field of the Invention

The present invention relates to a production method for deburring die for castings utilizing EDM (electric discharge machining), and more particularly to a production method for deburring die for castings utilizing EDM wherein a prototype of castings is directly utilized as an electrode of an EDM apparatus.

2. Related Arts

Conventionally, a deburring die has been produced in various methods. The deburring die, for example, may be produced by a primitive method comprising the steps of taking measurements of a prototype, storing the measurements in a computer, mechanically working die pieces by wire-cutting, cutting, grinding, or the like, based on the stored measurements, and assembling the die pieces into whole bodies of upper and lower dies. Alternatively, an electroforming method may be employed, which comprises the steps of forming a prototype from a material such as plaster, plastics and the like by the use of dies, copper-plating the thus formed prototype, and subjecting the copper-plated prototype to the electric discharge machining so as to produce the deburring dies. Such deburring dies are primarily used for the production of masks, phonograph records and the like. However, these methods require the prevention of reproduction of scars, cracks and the like produced in the prototype. Additionally, in the case of a prototype formed of a plastic material, the production process is complicated because a preprocessing such as sensitization of the surface of the prototype is required.

The applicant has filed several applications for solving the above problems. Of these, a simple method entitled "a Production Method for Deburring Die for Castings Utilizing EDM" has been disclosed in Japanese Unexamined Patent Publication No. Hei-1(1989)-115522. The gist of the above-mentioned method resides in that a prototype is used as an electrode of an EDM apparatus and a machining gap is defined between the prototype as an electrode and a lower or upper deburring die member and controlled by regulating the descending speed of the prototype while a pulse voltage is applied between the prototype as an electrode and the lower or upper deburring die member for electric discharge machining.

Conventional production methods involve difficulty in taking precise measurements of the prototype. It is particularly difficult to take precise measurements on castings having a specific three-dimensional configuration. Furthermore, the production of dies for such castings requires a highly skilled marking operation as well as great amounts of time and effort. In addition, the electroforming method suffers difficult electro-deposition and complicated works.

The production method as disclosed in the Japanese Unexamined Patent Publication No. Hei-1(1989)-115522 features the direct utilization of the prototype as the electrode. Unfortunately, the prototype will wear and therefore, a lower model die so produced tends to contain dimensional errors, even if such errors are quite small. Accordingly, reading the dimensions of the lower model die with errors gives imprecise measurement values, even if such errors are quite small. If a lower deburring die is produced based on such imprecise values, the resultant die naturally fails to be precisely dimensioned. In some cases, the production of the deburring die may require several prototypes which must be frequently changed in the production process, which is cumbersome.

OBJECT OF THE INVENTION

An object of the present invention is, therefore, to provide a production method for deburring die for castings utilizing EDM which is directed to a production of a reliable and precise upper and lower deburring die by means of the direct use of a prototype of castings as an electrode, or of a desired upper and lower deburring die requiring a reduced number of prototypes or reduced time and costs.

Other objects and advantages of the present invention will become apparent from the description of the preferred embodiments, which may be modified in any manner without departing from the scope and spirit of the invention.

SUMMARY OF THE INVENTION

According to the present invention, a production method for deburring die for castings utilizing a machining gap defined between an electrode of an EDM apparatus and a steel sheet or a cut member, feed control of the electrode, and electric discharge machining work effected by applying a pulse voltage between the electrode and the steel sheet or cut member, the production method comprises the steps of:

a numeric input step wherein a prototype for deburring die is horizontally mounted to a shank of the EDM apparatus with either one side thereof serving as a model for the front side of a lower die, a contour of the prototype is two-dimensionally detected based on the X- and Y-coordinates for obtaining the X- and Y-coordinate values thereof which are sequentially inputted in a control unit of the EDM apparatus so as to input all the X- and Y-coordinate values of the contour of the prototype;

an electric discharge machining step for the lower deburring die wherein based on the X- and Y-coordinate values inputted in the control unit in the numeric input step, a lower deburring die hole symmetrical with the contour of the prototype is formed in a steel sheet set in the EDM apparatus while a cut member is separated from the hole thus formed; and an electric discharge machining step for an upper deburring die wherein the prototype is directly used as the electrode and horizontally mounted to the shank of the EDM apparatus with the other side thereof serving as a model for the front side of an upper deburring die, and the cut member set in the EDM apparatus is subject to the electric discharge machining work by using the prototype thereby engraving in a front surface of the cut member an upper-die geometry symmetrical with that of the front side of the prototype.

As described in the foregoing, the production method for deburring die for castings is characterized in that the prototype of castings is directly used as a model for reading the X- and Y-coordinate values based on which the electric discharge machining is performed to produce the lower deburring die and the cut member, and that the cut member in combination with the prototype of castings as the electrode are subject to the electric discharge machining for producing the upper deburring die. Hence, the method of the invention provides an advantageous production of the upper and lower deburring die of high precision of dimensions and also reduces time, costs and consumption of resources required for the production of the upper and lower deburring die.

The production method of the invention is particularly characterized in that the prototype of castings is directly used as the electrode and hung in a horizontal position to be used for the electric discharge machining to produce the deburring die. This eliminates the need for design work such as measurement, marking and the like, and for processing works such as cutting, grinding and the like. Thus, the method of the invention simplifies and facilitates the production of dies while notably increasing the speed and efficiency of the work.

BRIEF EXPLANATION OF THE DRAWINGS

FIG. 8 shows a schematic diagram for illustrating the steps of forming the lower deburring die, of which

FIG. 10 shows a schematic diagram for illustrating the steps of forming the upper deburring die from the cut member, wherein FIG. 10A shows the cut member set on a table of the EDM apparatus, FIG. 10B shows a state when the electric discharge machining is started, FIG. 10C shows a state wherein the electric discharge machining is underway and FIG. 10D shows the completed upper deburring die.

DETAILED DESCRIPTION OF THE PREFERRED EMBODIMENTS

Figure 1:
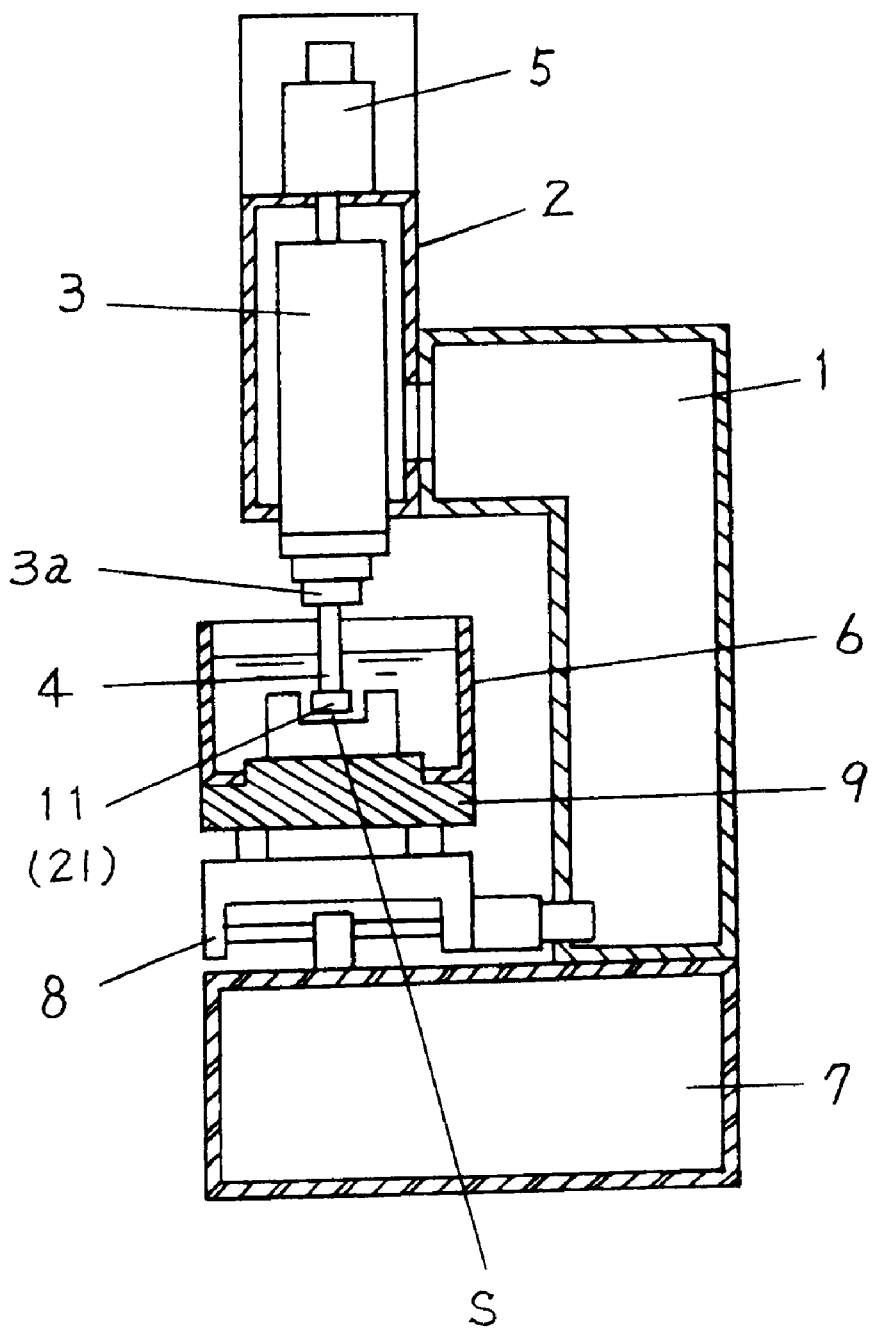
FIG. 1 shows a schematic diagram for illustrating an example of the apparatus employed by the present invention.

A preferred embodiment of a production method for deburring die for castings utilizing EDM according to the present invention, will now be described in detailed, with reference to the accompanying drawings.

According to the present invention, an EDM apparatus is employed for a production of an upper and lower deburring die for castings. In this production, a prototype having a complicated contour is adopted and directly used. More specifically, the prototype for deburring die is horizontally set in place with either one side thereof serving as a model for a front side of a lower die. A contour of the outer periphery of the prototype is two-dimensionally detected for obtaining X- and Y-coordinate values thereof, which are sequentially inputted in a control unit of the EDM apparatus so as to input all the X- and Y-coordinate values of the contour of the outer periphery of the prototype. Based on the X- and Y-coordinate values thus inputted in the control unit in the numeric input step, a lower deburring die hole symmetrical with the contour of the prototype is formed in a steel sheet set in the EDM apparatus while a cut member is separated from the hole. Thus, the lower deburring die is produced. On the other hand, the prototype is directly used as an electrode of the EDM apparatus and horizontally hung from a shank of the apparatus with the other side thereof serving as a model for the front side of the upper die or the cut member. The cut member set in the EDM apparatus is subject to an electric discharge machining work by the use of the prototype as a model so as to engrave in a front surface of the cut member a geometry symmetrical with that of the prototype. Upon completion of a predetermined engraving work, the cut member is processed into the upper deburring die having an upper die surface of the geometry symmetrical with that of the other side of the prototype. Thus are produced the upper and lower deburring dies congruent in dimensions with the prototype, in principle.

Reference numeral 1 denotes a column of an EDM apparatus, which column has a shank 2. The shank 2 incorporates an elevating head 3 with a free end 3a located externally of the shank 2 and adapted to move vertically relative to the shank 2 of the column 1. The elevating head 3 is provided with a shank 4 and a motor 5. A reference numerals 6, 7 and 8 denote a processing pan, a base and a cross table, respectively.

Figure 2:
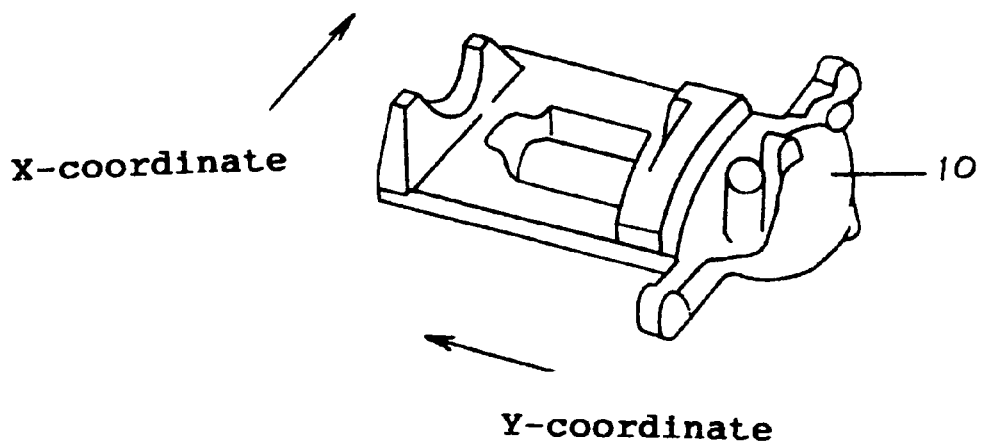
FIG. 2 shows a perspective view of an example of a prototype with its front side up.
Figure 3:
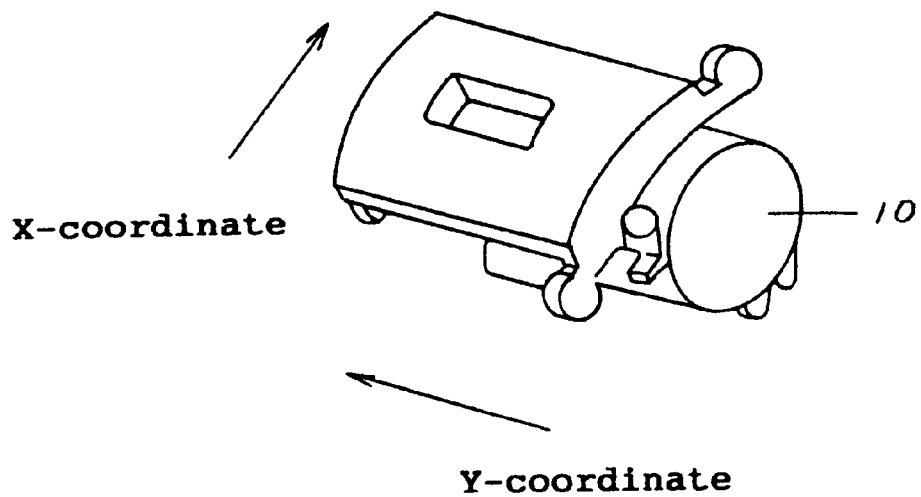
FIG. 3 shows a perspective view of an example of the above prototype with its back side up.
Figure 4:
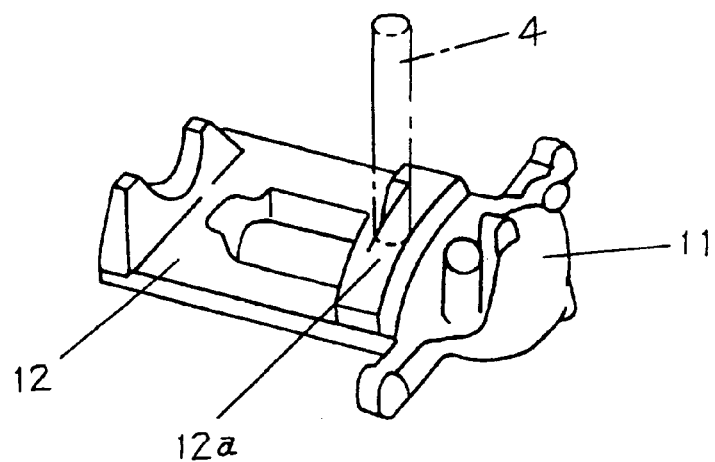
FIG. 4 shows a schematic diagram for illustrating the prototype with one side thereof serving as a model for the front side of a lower die and a positional relationship between this side of the prototype and a shank.
Figure 8C:
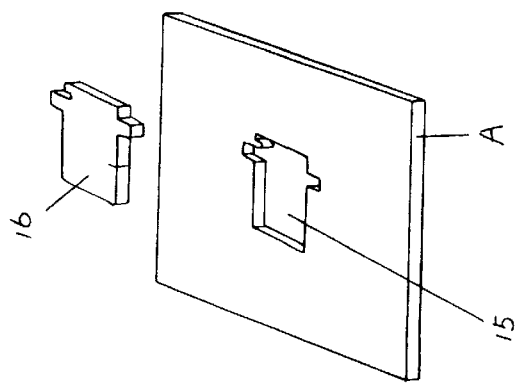
FIG. 8B shows a state wherein the wire-cutting is underway and FIG. 8C shows a state wherein the lower deburring die hole has been cut and a cut member is separated therefrom.
Figure 8B:
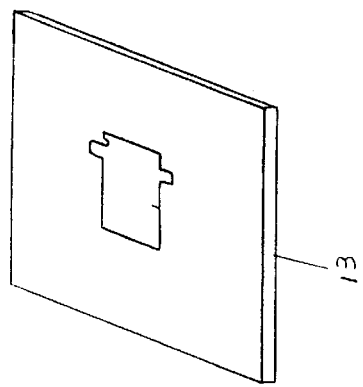
Figure 8A:
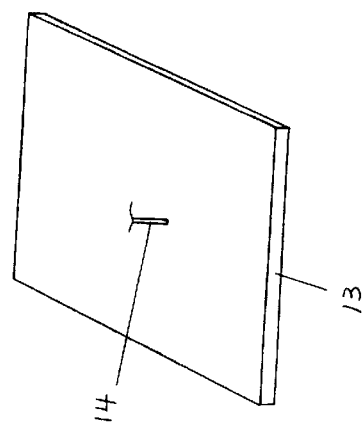
FIG. 8A shows a state when the wire-cutting is started.
Figure 9:
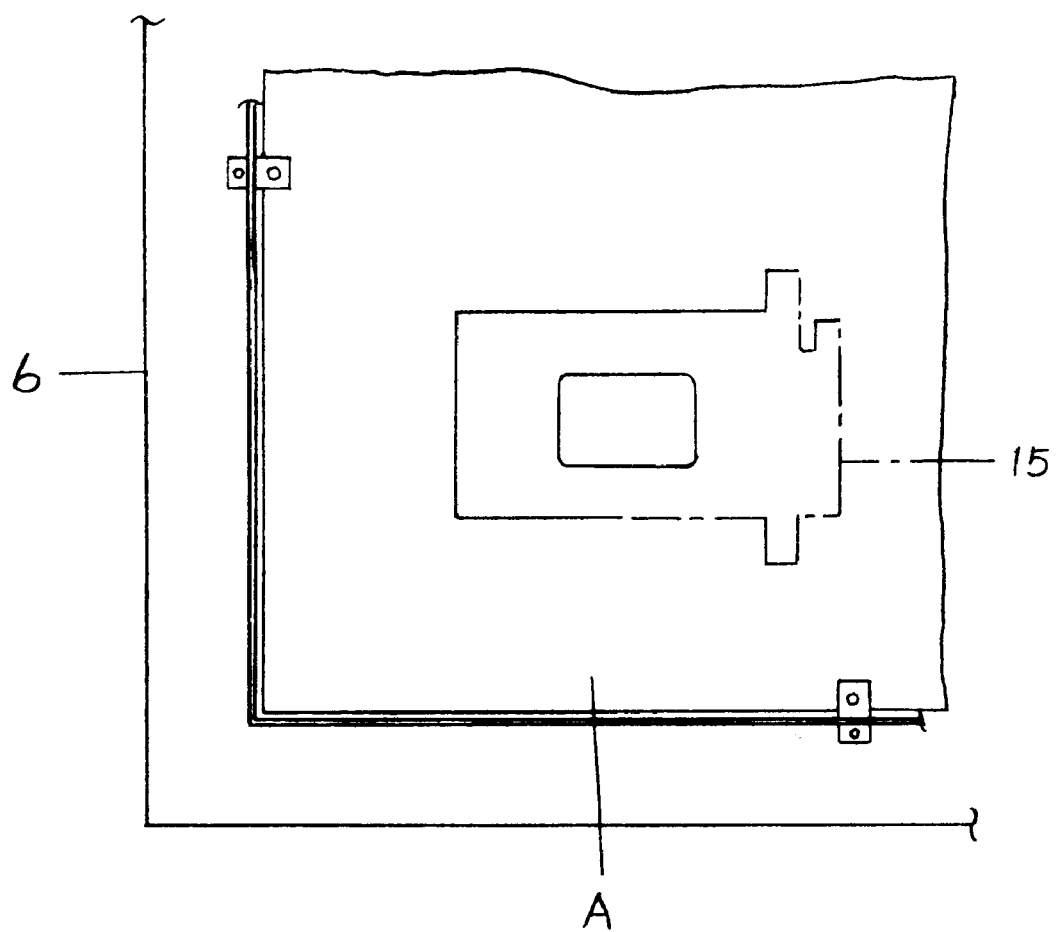
FIG. 9 shows a schematic diagram for illustrating the completed lower deburring die.

The EDM apparatus is employed for producing an upper and lower deburring die for castings in accordance with the present invention. A prototype 10 of a complicated contour, such as shown in FIGS. 2 and 3, is adopted and used in a direct manner. In other words, the prototype 10 is used as a model 11 for reading the X- and Y-coordinates thereof which are used for defining the contour of a lower deburring die A. As shown in FIG. 4, either one side 12 of the model 11 serves as a model for the front side of a lower die. The shank 4 of the EDM apparatus is attached to a horizontal portion 12a of the side 12 as the model for the front side of the lower die so that the prototype 10 hangs in the EDM apparatus (where the horizontal portion 12a does not exist, the horizontal portion 12a may be formed by cutting or the like). As shown in FIG. 2, the contour of the outer periphery of the prototype 10 is detected based on the X- and Y-coordinates, the values of which are sequentially inputted in a control unit of the EDM apparatus so as to input all the X- and Y-coordinate values of the contour. Based on the X- and Y-coordinate values thus inputted in the control unit in the numeric input step, as shown in FIG. 8A and 8B, a plate-like steel sheet 13 set on a table 9 of the EDM apparatus is subject to wire-cutting by way of a wire 14, whereby a lower deburring die hole 15 is formed in the steel sheet 13 based on the stored X- and Y-coordinate values, as shown in FIG. 8C. Thus, the deburring lower die A with the lower deburring die hole 15 is produced whereas a resultant cut member 16 is used as an upper deburring die member. It is to be noted that the vertical cut surfaces of the lower deburring die hole 15 is preferably tapered.

Figure 5:
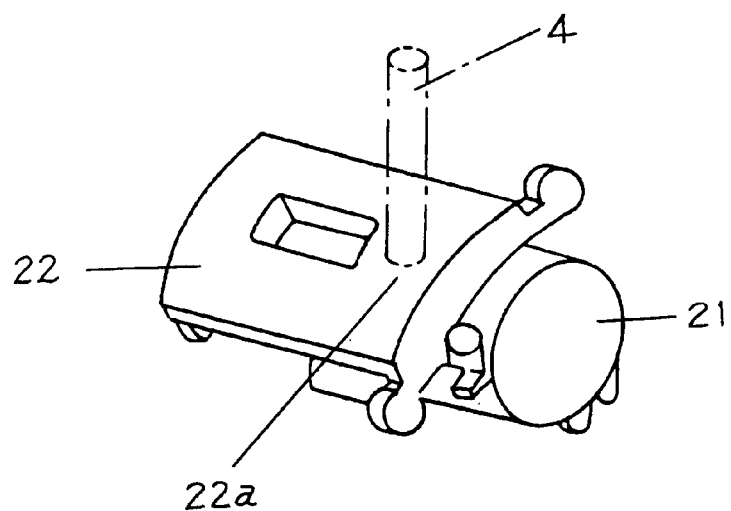
FIG. 5 shows a schematic diagram for illustrating the prototype with the other side thereof serving as a model for the front side of an upper die and a positional relationship between this side of the prototype and a shank.
Figure 6:
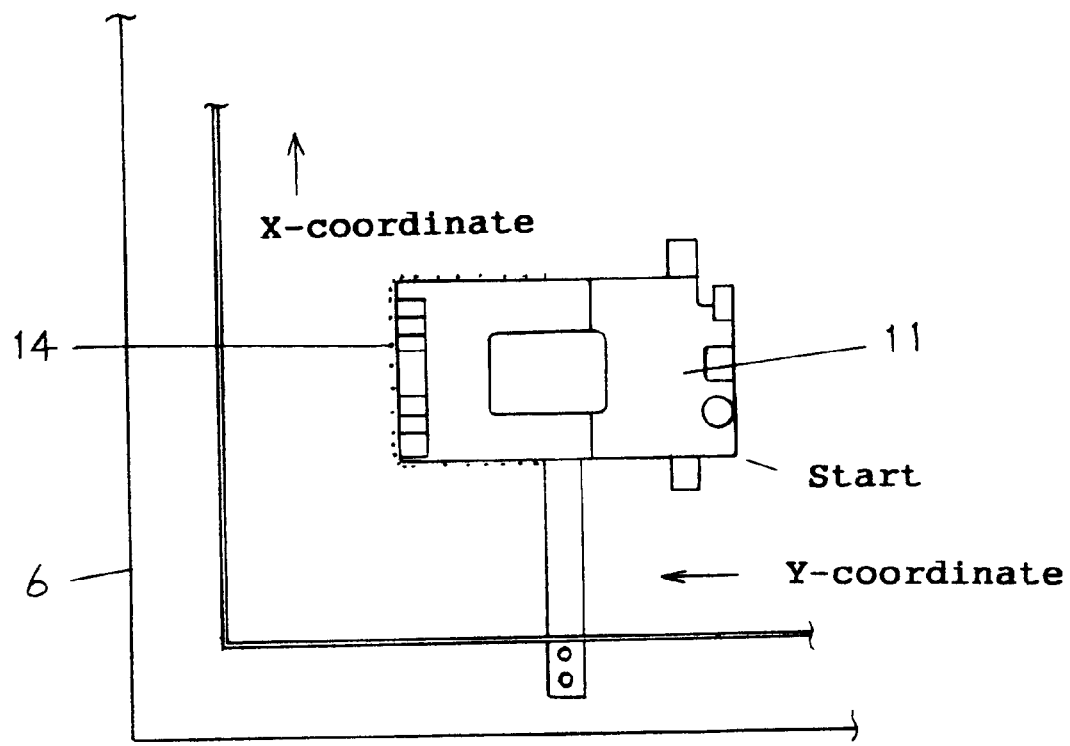
FIG. 6 shows a schematic diagram for illustrating a state wherein the X- and Y-coordinate values of a contour of the outer ends of the prototype are measured.
Figure 7:
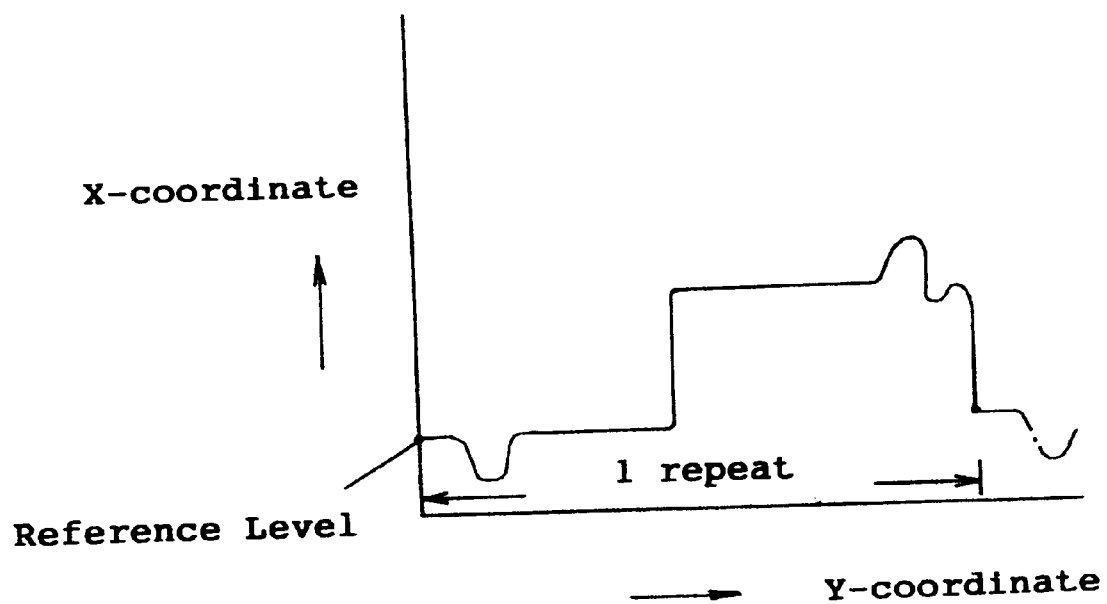
FIG. 7 shows a graphical representation of the X- and Y-coordinate values of the contour of the outer periphery of the prototype.

Next, the prototype 10 is used as an electrode 21 of the EDM apparatus. More specifically, as shown in FIG. 5, the other side 22 of the electrode 21 serves as a model for the front side of the upper die. The shank 4 of the EDM apparatus is attached to a horizontal portion 22a of the side 22 as the model for the front side of the upper die. On the other hand, the cut member 16 is set on the table 9 of the EDM apparatus as shown in FIG. 10A. With a switch (not shown) of the EDM apparatus turned on, the elevating head 3 and the shank 4 start to descend and so does the electrode 21. When the electrode 21 has descended for a predetermined distance to define a predetermined machining gap S between the electrode 21 and the cut member 16 as shown FIG. 10B, a pulse voltage is periodically applied between the electrode 21 and the cut member 16 for pulse discharge such as to effect the electric discharge machining on the surface of the cut member 16 in correspondence with a geometry of the electrode 21 for forming an upper deburring die surface 17. These electric discharge machining works are repeated in cycles while the electrode 21 advances toward the cut member 16, and thus is produced an upper deburring die B with a male surface or the upper die surface 17 engraved symmetrically with the geometry of the electrode 21 as shown in FIGS. 10C and 10D. Subsequently, the EDM apparatus is turned off and the resultant upper deburring die B is removed from the table 9 to complete the operations.

As described in the foregoing, the production method for deburring die for castings is characterized in that the prototype of castings is directly used as a model for reading the X- and Y-coordinate values based on which the electric discharge machining is performed to produce the lower deburring die and the cut member, and that the cut member in combination with the prototype of castings as the electrode are subject to the electric discharge machining for producing the upper deburring die. Hence, the method of the invention provides an advantageous production of the upper and lower deburring die of high precision of dimensions and also reduces time, costs and consumption of resources required for the production of the upper and lower deburring die.

The production method of the present invention is particularly characterized in that the prototype of castings is directly used as the electrode and hung in a horizontal position to be used for the electric discharge machining to produce the deburring die. This eliminates the need for design works such as measurement, marking and the like, and for processing works such as cutting, grinding and the like. Thus, the method of the invention simplifies and facilitates the production of dies while notably increasing the speed and efficiency of the work.

The terms and expressions which have been employed herein are used as terms of description and not of limitation, and there is no intent, in the use of such terms and expressions, of excluding any equivalents of the features shown and described or portions thereof, but it should be recognized that various modifications are possible within the scope of the invention claimed.

What is claimed is:

1. A production method for deburring die for castings utilizing a machining gap defined between an electrode of an electric discharge machine apparatus and a steel sheet or a cut member, an electric discharge machining work effected by applying a pulse voltage to said machining gap and feed control of said electrode, the method comprising the steps of:

a numeric input step wherein a prototype for said deburring die is horizontally mounted to a shank of said electric discharge machine apparatus with either one side thereof serving as a model for a front side of a lower deburring die, a contour of said prototype is two-dimensionally detected based on X- and Y-coordinates for obtaining X- and Y-coordinate values thereof which are sequentially inputted in a control unit of said electric discharge machine apparatus so as to input all said X- and Y-coordinate values of said contour of said prototype;

an electric discharge machining step for said lower deburring die wherein based on said X- and Y-coordinate values inputted in said control unit in said numeric input step, a lower deburring die hole symmetrical with said contour of said prototype is formed in said sheet member set in said electric discharge machine apparatus while a cut member is separated from a hole thus formed; and an electric discharge machining step for an upper deburring die wherein said prototype is directly used as said electrode and horizontally mounted to said shank of said electric discharge machine apparatus with the other side thereof serving as a model for a front side of an upper deburring die, and said cut member set in said electric discharge machine apparatus is subject to said electric discharge machining work by using said prototype thereby engraving in a front surface of said cut member an upper-die geometry symmetrical with that of said front side of said prototype.

2. A method for producing a deburring die for castings comprising the steps of:

a) mounting a prototype having a front surface and a contour to a shank of an electric discharge machining apparatus, determining X- and Y-coordinate values representing the contour of the prototype, and inputting said coordinate values into a control unit of the electric discharge machining apparatus;

b) forming a lower deburring die hole symmetrical with said contour of said prototype in a sheet by electric discharge machining based on the X- and Y-coordinate values input in said control unit in step a) and separating a cut member from a lower deburring die hole thus formed in the sheet; and c) setting the cut member in the electric discharge machining apparatus and using the front surface of the prototype as an electrode to machine an upper deburring die symmetrical to the front surface of the prototype on the cut member.

3. The method of claim 2, wherein the prototype in step a) is mounted horizontally to the shank of the electric discharge machining apparatus.

4. The method of claim 3, wherein said shank incorporates an elevating head, the elevating head having a free end located externally of the shank and adapted to move vertically relative to the shank.

5. The method of claim 2, wherein said sheet is a steel sheet.

6. The method of claim 5, wherein said step (b) of forming comprises wire cutting said steel sheet set on said electric discharge machining apparatus.

7. The method of claim 2, wherein step (c) comprises electric discharge machining the cut member.

8. The method of claim 7, wherein a pulse voltage is periodically applied between said electrode and said cut member so that electric discharge machining an upper deburring die surface on said cut member.

* * * * *